United States Patent [19]

Newman et al.

[11] 4,317,592
[45] Mar. 2, 1982

[54] TRUCK BED UNLOADING DEVICE

[76] Inventors: Caroline Newman, c/o George Spector, 3615 Woolworth Bldg., 233 Broadway; George Spector, 3615 Woolworth Bldg., 233 Broadway, both of New York, N.Y. 10007

[21] Appl. No.: 63,813

[22] Filed: Aug. 6, 1979

[51] Int. Cl.³ .............................................. B60P 1/00
[52] U.S. Cl. ......................................... 298/7; 193/5; 296/184
[58] Field of Search ............... 298/17 R, 17.7, 23 R, 298/1 B, 7, 8, 1 R; 193/31, 4, 5, 26; 105/261, 279; 405/87–91; 222/526, 527; 296/184; 404/110, 101

[56] References Cited

U.S. PATENT DOCUMENTS

| | | | |
|---|---|---|---|
| 1,113,443 | 10/1914 | Isom | 298/7 |
| 1,548,255 | 8/1925 | Chenoweth | 298/7 |
| 2,194,763 | 3/1940 | Mayer | 298/7 |
| 2,674,489 | 4/1954 | Maxon | 298/17 R |
| 2,878,053 | 3/1959 | Yuncker | 298/7 |
| 3,729,230 | 4/1973 | Tomlinson et al. | 298/17 R X |

*Primary Examiner*—David A. Scherbel
*Assistant Examiner*—Kenneth Noland

[57] ABSTRACT

A device attachable upon a dump truck bed for dividing a load being dumped. The device including a unit that is shaped like two adjacent sides of a pyramid, and an anchoring means along a lower edge of the two sides for securement near a rear end of the truck bed in a position so that the two walls spread apart rearwardly prow-like from a forward connected edges.

1 Claim, 6 Drawing Figures

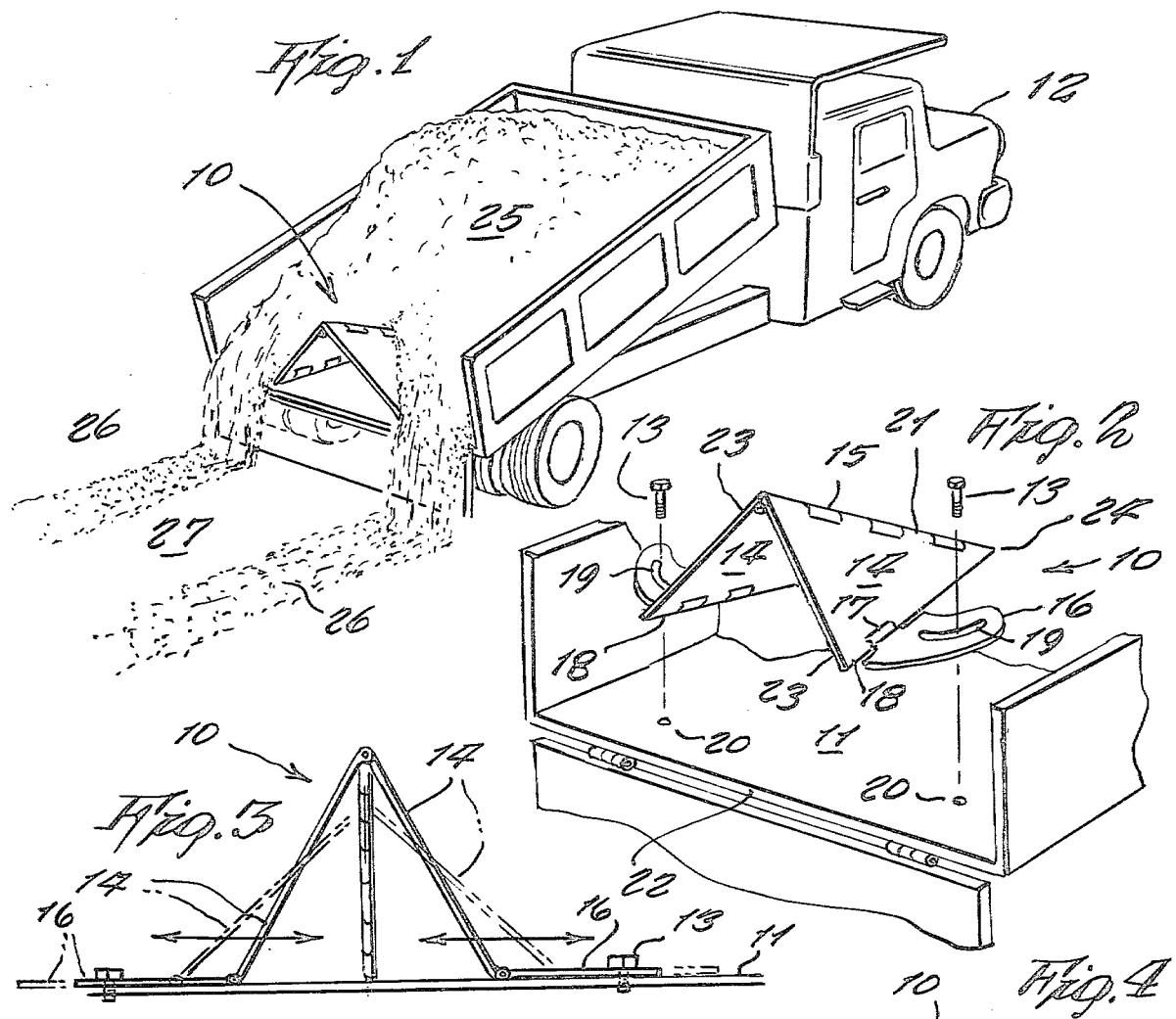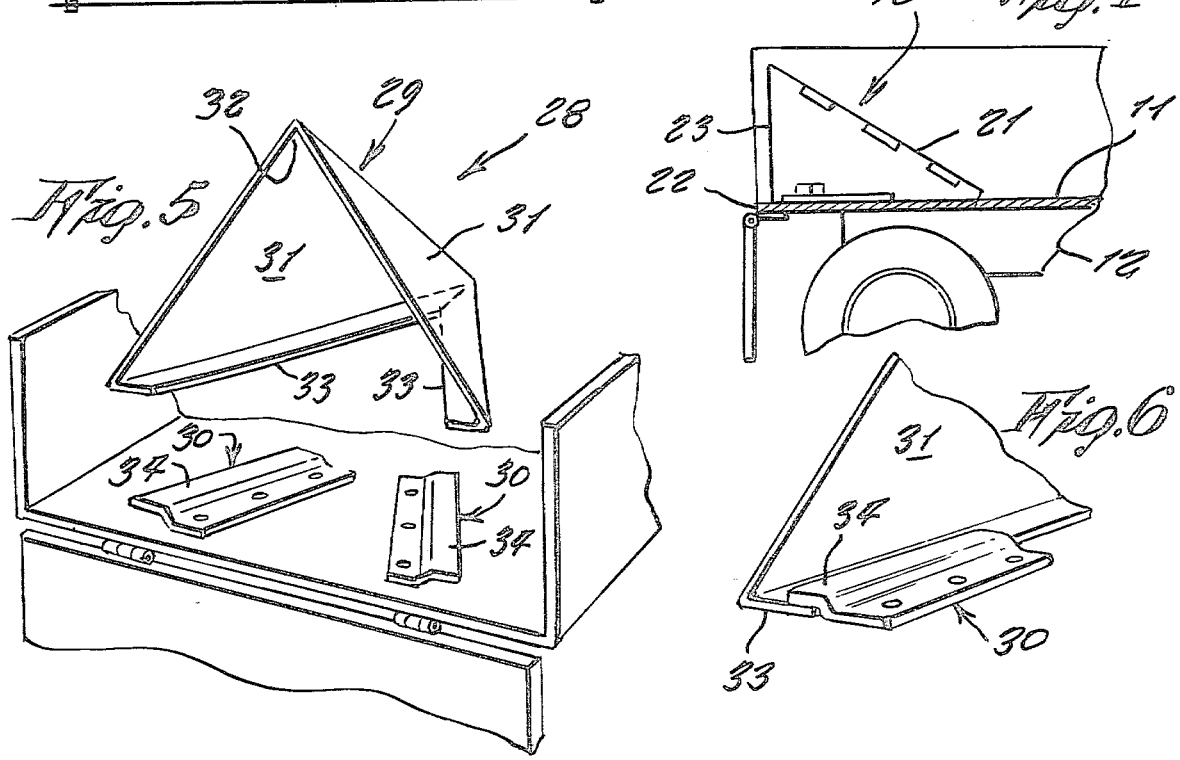

TRUCK BED UNLOADING DEVICE

This invention relates generally to dump truck accessories.

It is well known to those who are acquainted with the particular field, that when a dump truck unloads slag or gravel, while moving ahead, so to lay out a road surface upon which vehicle wheels can travel, that it falls out of the truck across a full width of the road. After vehicles travel awhile on such surface, the wheels pressing it down, a hump gradually results between the wheel ruts which can scrape against the vehicle bottom and oil pan, causing damage thereto, so that this situation is in need of an improvement.

Therefore, it is a principal object of the present invention to provide a truck bed unloading device, attachable thereto so as to divide slag or gravel being unloaded for road purpose, in order that it unloads only at the two sides and not a middle of the truck rear end.

Another object accordingly is to provide an unloading device which eliminates the eventual need thereafter of a scraper to come and scrape down a hump formed by the material between the road tracks.

Still another object is to provide an unloading device which accordingly saves on material which otherwise is wasted by being dumped upon a middle of a road.

Yet a further object is to provide an unloading device which is adjustable in width so as to lay wheel tracks that are controlled distance apart for suiting the particular vehicles to travel the road, such as conventional cars or heavy, wide apart wheeled equipment such as is used in logging or mining industries.

FIG. 1 is a perspective view of one design of the invention and which is adjustable so to spill gravel either farther or closer as much apart, as wished.

FIG. 2 is a perspective view of the invention, shown positioned for assembly upon the truck bed.

FIG. 3 is a rear view thereof, assembled.

FIG. 4 is a side view thereof.

FIG. 5 is a perspective view of another design of the invention shown positioned for assembly upon the truck bed.

FIG. 6 is an enlarged detail thereof, shown assembled.

Referring now to the drawing in greater detail, and more particularly to FIGS. 1 through 4 thereof, at this time, the reference numeral 10 represents a truck bed unloading device according to the present invention, wherein the same comprises a divider which is removably mountable upon a bed 11 of a dump truck 12, by means of a pair of mounting screws 13.

The divider consists of two same sized, triangular shaped, flat steel plates 14 which along one edges are pivotally joined by a hinge 15 formed therebetween. A flat foot plate 16 made also of steel, is pivotally secured by means of a hinge 17 along another edge 18 of each plate 14 and which becomes a lower edge of the divider thus formed. An arcuate slot 19 in each foot plate serves to receive the mounting screw 13 which threads in a hole 20 in the truck bed.

The divider is mounted on the truck so that a prowlike leading edge 21 thereof having the hinge 15 faces in a forward direction of the truck, and the divider is placed at a center along a rear edge 22 of the bed, with end edges 23 aligned approximately therewith.

It is to be noted that slots 19 curve in a direction approximately about a point 24 at a lower end of edge 21.

In use, as shown in FIG. 1, when the truck bed is raised, and the truck travels ahead, the slog or gravel 25 spills from the truck in two spread apart streams, so to form two tracks 26, upon a road. By pivoting the plates 14 at greater or lesser angle apart at the hinge 15, the tracks can be made with space 27 therebetween of varied width.

In FIGS. 5 and 6 a modified design of unloading device 28 comprises divider 29 of rigid construction, and a pair of retains 30 permanently bolted on the truck bed.

The divider comprises triangular panels 31 made in one piece by a bend 32 therebetween so to form the above described leading edge 21. A lower edge of each panel is integral with an inwardly bent flange 33, for being fitted under an upwardly raised lip 34 of each retainer.

In this design, the divider is slided in a rearward direction upon the truck bed until the flanges fit under the lip 34 for quick and easy attachment or removal. The device 28 may be made in different sizes so to produce different widths of space 27 between wheel tracks 26.

What is claimed:

1. A truck bed divider comprising inclined walls having spaced lower edges intersecting at a forward end, including an upper edge formed at the intersection of said walls, said upper edge intersecting the lower edges at said forward end and being spaced from said lower edges at a rearward end of said divider including means for removably and adjustably mounting said divider on a truck bed, said means include a pivotal connection along said upper edge of each of said walls, and connection between said walls and truck bed providing for relative movement therebetween, said connection between said walls and truck bed comprising a plate attached to each of said walls, said plates each having a groove to accept a bolt therethrough at variable locations along said groove.

* * * * *